Oct. 8, 1968 — M. H. DOLITON ET AL — 3,404,520

LAWN EDGER

Filed Oct. 21, 1965 — 2 Sheets-Sheet 1

INVENTORS
MEYER H. DOLITON
SIDNEY J. GOODMAN

BY
*James and Franklin*

ATTORNEY

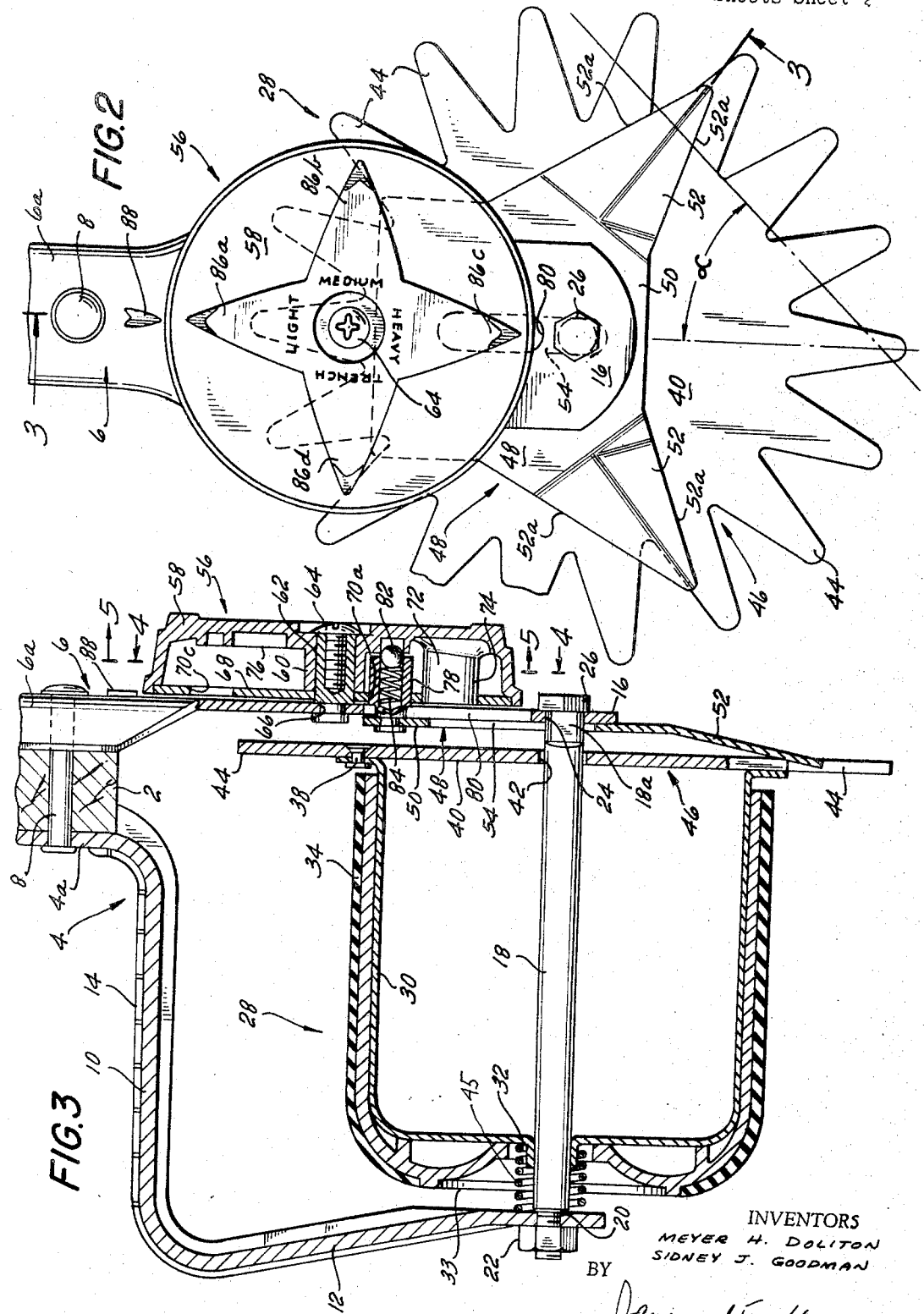

United States Patent Office 3,404,520
Patented Oct. 8, 1968

3,404,520
LAWN EDGER
Meyer H. Doliton, New York, N.Y., and Sidney J. Goodman, Fort Lee, N.J., assignors to International Patent Research Corp., New York, N.Y., a corporation of New York
Filed Oct. 21, 1965, Ser. No. 500,151
25 Claims. (Cl. 56—256)

The present invention relates to a lawn edger in which the cutting and/or digging level is adjustable.

Lawn mowers are effectual to cut grass only over substantially continuous grass areas, where the wheels at each end of the mower are uniformly supported by the lawn surface. They are notoriously ineffectual in cutting grass at the edges of lawn areas—next to sidewalks, abutting flowerbeds and the like. For edge cutting purposes, a special tool has been developed known as a lawn edger. This type of tool has assumed various forms of greater or lesser effectiveness in producing a grass cut at the edges of grassy areas.

One major drawback of the types of lawn edger construction previously known is that the location of the grass cutting blade on the edger structure is relatively fixed. Hence the height at which the grass cut or earth dig is achieved cannot readily be adjusted. Moreover, since the edger, when cutting edge grass, is normally supported on the non-grassy surface adjacent the lawn, and since the level of that surface relative to the lawn may vary widely from place to place—a flowerbed may well be lower than a sidewalk—achieving a uniform height of grass cut and earth dig along all of the edges of a given lawn is difficult, if not impossible, to attain with prior art structures.

It is the primary object of the present invention to devise a lawn edger in which the height of the grass cut and/or earth dig may be readily adjusted and varied in accordance with the desires of the user or in order to accommodate different terrain conditions. (In this specification the term "cutting" will hereinafter be used generically to include both conventional grass cutting and earth cutting or digging, or both.) It is a further prime object of the present invention to devise such a construction which is not only readily operated even by unskilled users, but which is also readily and inexpensively assembled, which is formed of a series of simple manufactured parts, and which is sturdy and reliable and not subject to dislocation, damage or deterioration.

In accordance with these objects, the lawn edger, as is conventional, comprises a ground-engaging wheel to which a rotatable cutting element is connected, the device being provided with a second cutting element cooperating with the rotatable cutting element in order to produce a cutting effect. The second cutting element is fixed relative to the device during the cutting operation, but in accordance with the present invention it is so mounted on the device that its height relative to the ground is adjustable. This adjustment is accomplished by means of a control element which is mounted on the exterior of the device in a readily accessible fashion. As here specifically disclosed the control element is in the form of a dial or knob which is provided with a cam slot, and the second cutting element is provided with a cam follower which is engaged within the cam slot. The support for both the second cutting element and the control element is provided with an elongated vertical slot through which the cam follower passes, that vertical slot therefore preventing rotation of the second cutting element but permitting its vertical adjustability.

The control element may be provided with a series of detent areas determining a series of operative positions for the control element corresponding to different heights for the second cutting element. As here specifically disclosed these detent areas are provided on the interior of the control element, and the cam follower secured to the second cutting element extends through the aforementioned cam slot and itself engages those areas on the control element to produce the detenting action.

The first cutting element is preferably rotatable on or with a shaft and is axially movable toward and into cooperating engagement with the second cutting element, the first cutting element being spring urged in that direction. The aforementioned shaft passes through an elongated slot in the second cutting element, thereby further guiding the latter, preventing its rotation, but permitting is vertical adjustment.

To the accomplishment of the above, and to such other objects as may hereinafter appear, the present invention relates to the construction of a lawn edger as defined in the appended claims and as described in this specification, taken together with the accompanying drawings, in which:

FIG. 2 is a fragmentary side elevational view thereof on an enlarged scale;

FIG. 3 is a cross sectional view taken along the line 3—3 of FIG. 2; and

Figure 1:
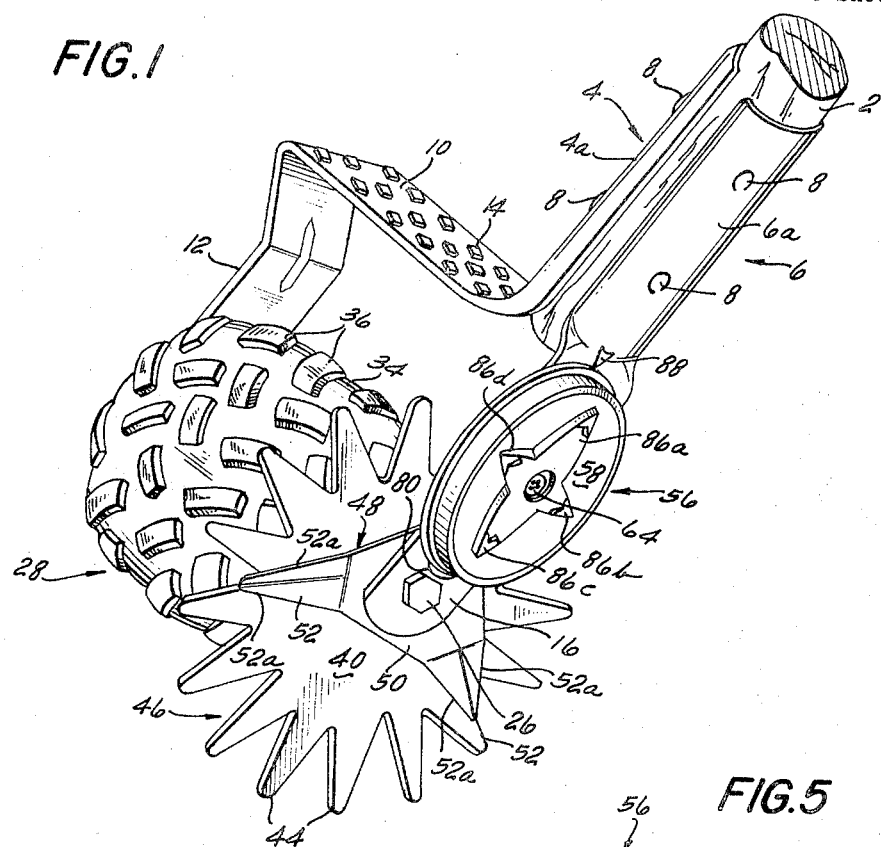
FIG. 1 is a three-quarter perspective view of a preferred embodiment of the present invention.
Figure 4:
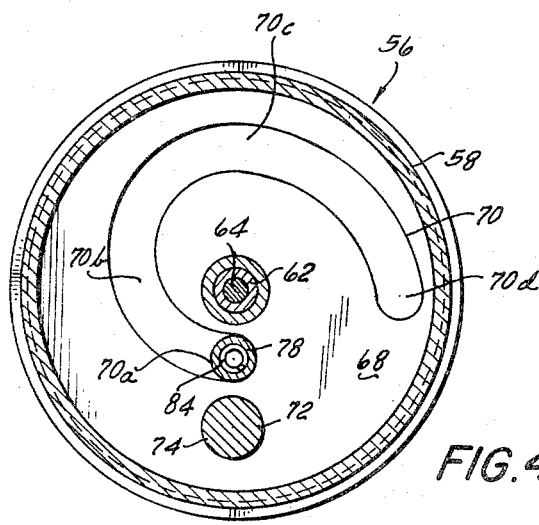
Figure 5:
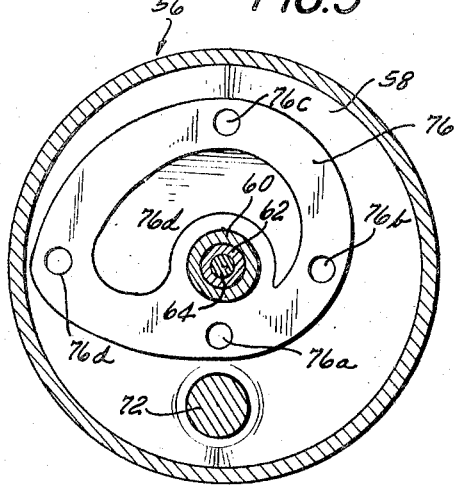

FIGS. 4 and 5 are cross sectional views taken along the lines 4—4 and 5—5 respectively of FIG. 3.

The preferred form of the instant invention, as here specifically disclosed, comprises an upstanding handle 2 at the lower end of which is secured a pair of supporting brackets generally designated 4 and 6, those brackets having handle engaging portions 4a and 6a received on opposite sides of the lower handle end and held in place by any appropriate means such as rivets 8.

Extending out laterally from the handle engaging portion 4a of bracket 4 is a flat-topped part 10 from which an arm 12 depends. The part 10 is adapted to be engaged and pressed upon by the foot of the user of the device, and consequently is provided with a non-slip upper surface defined, as here specifically disclosed, by the upward projections 14. A structural member 16 depends from the handle engaging part 6a of the bracket 6 in a position laterally spaced from but opposed to the arm 12.

A shaft 18 extends between the lower ends of the arm 12 and member 16, the left hand end of the shaft 18 extending through and beyond aperture 20 in the arm 12 and having nut 22 threadedly received thereon, the right hand end of the shaft 18 having a non-circular portion 18a which extends through an aperture 24 in the member 16, a tip of the shaft extending beyond the portion 18a and threadedly receiving nut 26 thereon.

The rotating unit of the edger, generally designated 28, is mounted on the shaft 18 so as to be rotatable thereabout and axially movable therealong. The rotatable unit 28 comprises a wheel portion 30 of appreciable axial length which, at its left hand end as viewed in FIG. 3, is provided with a hub 32 rotatably and axially slidably received on the shaft 18. It is also provided with a frictional outer surface defined by rubber covering 34 with cleats 36 molded thereinto. The right hand end of the wheel portion 30 is open, and has secured thereto, as by the rivets 38, a disk 40 provided with a central aperture 42 through which the shaft 18 passes. The periphery of the disk 40 is provided with a series of projecting teeth 44 which extend radially out beyond the wheel portion 30, the disk 40 with its teeth 44 comprising the rotatable cutting element of the edger. A spring 45 is compressed beween the hub 32 and the arm 12, thereby urging the rotating unit 26 to the right as viewed in FIG. 3, toward the member 16.

The relatively fixed cutting element of the edger, which cooperates with the rotatable cutting element 46, is generally designated 48. It comprises a body portion 50 which engages the inner surface of the member 16 (that surface of the member 16 which faces the arm 12), from which body portion a pair of teeth 52 extend, the teeth 52 being oriented angularly downwardly and outwardly relative to the height of the body portion 50 and also being angled to the left as viewed in FIG. 3, toward the arm 12. The tips of the teeth 52 extend out beyond the roots of the teeth 44 on the rotating cutting element 46, as may clearly be seen in FIG. 2. One or more of the edges 52a of the teeth 52 are preferably sharpened, so as to enhance the cutting effect produced thereby in conjunction with the rotary cutting element 46. The body portion 50 of the cutting element 48 is provided with an elongated slot 54 through which the non-circular portion 18a of the shaft 18 passes, the shaft portion 18a functioning in conjunction with the slot 54 to permit vertical movement of the cutting element 48 relative to the member 16 (and hence also relative to the rotatable cutting element 46) while preventing rotation or lateral shifting of the cutting element 48 relative to the member 16.

Mounted on the outer surface of the member 16, and hence in a position where it is readily accessible for manipulation, is the control element generally designated 46. It is here shown in the form of a knob or dial 58 having hub 60 which is fastened to shaft 62 by screw 64, the shaft 62 being rotatably secured in aperture 66 formed in member 16, the knob 58 thus being rotatable about the axis of the shaft 62. Mounted on and substantially closing the left hand end of the knob 58 (as viewed in FIG. 3) is a plate 68 provided with a cam slot 70 which is non-concentric with the axis of the shaft 62, so that different portions of the cam slot 70 are at different distances from that axis. Thus slot portion 70a is close to the axis of the shaft 62, slot portion 70b is somewhat further therefrom, slot portion 70c is still farther therefrom, and the slot portion 70d is even more remote therefrom. Rotation of the plate 68, and hence of the cam slot 70, with the knob 58 is ensured by means of post 72, preferably formed integral with the knob 58, which is snugly received within aperture 74 formed in the plate 68. The plate 68, it will be noted, substantially closes the interior of the knob 58, thus substantially preventing the entry of dirt, cut grass or the like into the knob 56.

The inner face of the knob 58 may be provided with a raised portion 76 located opposite the cam slot 70, which raised portion is provided with a plurality of recesses 76a, 76b, 76c and 76d, corresponding respectively to the cam slot portions 70a, 70b, 70c and 70d.

A cam follower 78 is secured to the body portion 50 of the second cutting element 48. The member 16 is provided with a vertically elongated slot 80 through which the cam follower 78 extends, the cam follower 78 also passing through the cam slot 70 and extending toward the raised portion 76 within the knob 58. A detent ball 82 is mounted on the tip of the cam follower 78 and is resiliently urged outwardly by means of spring 84, the ball 82 being shaped to be received within one or another of the detent recesses 76a–b. The outer surface of the knob 58 is provided with a plurality of indicia 86a, 86b, 86c and 86d, here shown as labelled respectively "light," "medium," "heavy" and "trench," these indicia cooperating with a fixed index 88 on the bracket portion 6a and corresponding respectively with the cam slot portions 70a–70d and the detent recesses 76a–76d.

The operation of the device will in the main be clear from the above description of its construction. In use, with the cutting element 48 in desired position, the wheel 30 is supported on the ground, the teeth 44 of the rotating cutting element 46 are inserted into the ground adjacent the lawn edge where cutting is to take place, and the device is then rolled along the desired edge line, being held in the ground through the application of foot pressure on the bracket portion 10 when that is required. As the wheel 30 rotates the cutting element 46 rotates relative to the cutting element 48, the teeth 52 cooperating with the teeth 44 of the former in order to cut the grass blades which are caught between them, the teeth 52 further producing a plowing or soil cutting action if they penetrate below the soil level.

The vertical position of the cutting element 48 may readily be adjusted, thereby to control the height of grass cut and/or the depth of soil cut or dug into, through rotation of the control element 56. That element and the associated parts are, in the drawings, shown in the position of maximum height for the cutting element 48, at which time the cam follower 78 secured to the cutting element 48 engages the cam slot 70 at the portion 70a which is closest to the axis of rotation of the knob 58. At this point the ball 82 carried by the cam follower 78 is received within detent recess 76a.

If now it is desired to move the cutting element 48 downwardly relative to the cutting element 76, thereby to cut the grass shorter or cut into the earth more deeply, the knob 58 is rotated to bring the "medium" index marker 86b opposite the fixed index 88. The resultant rotation of the cam slot 70 brings the cam follower 78 into the area 70b thereof, thus moving the cam follower down along the slot 80, the cutting element 48 moving downwardly, sliding over the shaft portion 18a. At an appropriate time during the rotation of the knob 58 the ball 82 carried by the cam follower 78 will snap into the aperture 76b. Continued rotation of the knob 58 to bring either the "heavy" index 86c or the "trench" index 86d opposite the fixed index 88 will cause the cutting element 78 to move further downwardly, guided and controlled in that movement by the sliding of the cam follower 78 in the cam slot 70 and in the slot 80 and the sliding of the body portion 50 of the cutting element 48 over the shaft portion 18a. The axial position of the rotating unit 28, and in particular the cooperating engagement between the cutting elements 46 and 48, is achieved by means of the axial movement of the unit 28 along the shaft 18, as urged by the spring 45. This spring-urged axial movement not only accommodates for the inclination of the teeth 52 toward the arm 12 (best shown in FIG. 3) but also prevents damage to the cutting edges in the event that pieces of wire or heavy twigs are engaged between the cutting teeth, the resilient axial movement of the unit 28 permitting the cutting elements to separate axially under such conditions.

It will be appreciated from the above that, by means of a sturdy and simplified construction, none of the parts of which need be manufactured to any particularly high degree of dimensional tolerance, a lawn edger construction has been produced which performs the conventional functions of such a device in a highly effective fashion and which in addition provides for ready adjustability of the relative vertical positions of the cutting element.

While but a single embodiment of the present invention is here specifically disclosed, it will be apparent that many variations may be made therein, all within the scope of the present invention as defined in the following claims.

We claim:

1. A lawn edger comprising a support, a first cutting element rotatably mounted on said support so as to rotate about an axis, a second cutting element comprising a pair of blades located on either side of said axis and cooperating with said first cutting element, said second cutting element being mounted on said support so as to be vertically movable relative thereto with each of said blades correspondingly moving vertically therewith, a control element mounted on the exterior of said support and movable between a plurality of operative positions, and means operatively connecting said control element and said second cutting element for positioning the latter vertically relative to said support in accordance with the operative position of said control element.

2. The lawn edger of claim 1, in which said operative connection comprises a cam operatively connected to said control element for movement therewith and a cam follower operatively connected to said second cutting element and engaging said cam.

3. The lawn edger of claim 1, in which said operative connection comprises a cam mounted on said support and operatively connected to said control element for movement therewith, and a cam follower operatively connected to said second cutting element and engaging said cam.

4. The lawn edger of claim 1, in which said operative connection comprises a cam mounted on the exterior of said support and operatively connected to said control element for movement therewith, and a cam follower operatively connected to said second cutting element and engaging said cam.

5. The lawn edger of claim 1, in which said operative connection comprises a cam mounted on said support and operatively connected to said control element for movement therewith, said support having a vertically elongated slot, and a cam follower operatively connected to said second cutting element, passing through said slot, and engaging said cam.

6. The lawn edger of claim 5, in which said first cutting element is operatively connected to a shaft and said second cutting element is provided with a vertically elongated slot, said shaft passing through said slot in said second cutting element.

7. The lawn edger of claim 5, in which said first cutting element is operatively connected to a shaft and said second cutting element is provided with a vertically elongated slot, said shaft passing through said slot in said second cutting element, and resilient means urging said first cutting element against said second cutting element.

8. The lawn edger of claim 1, in which said operative connection comprises a cam mounted on said support and operatively connected to said control element for movement therewith, said support having a vertically elongated slot, and a cam follower operatively connected to said second cutting element, passing through said slot, and engaging said cam.

9. The lawn edger of claim 8, in which said first cutting element is operatively connected to a shaft and said second cutting element is provided with a vertically elongated slot, said shaft passing through said slot in said second cutting element.

10. The lawn edger of claim 8, in which said first cutting element is operatively connected to a shaft and said second cutting element is provided with a vertically elongated slot, said shaft passing through said slot in said second cutting element, and resilient means urging said first cutting element against said second cutting element.

11. The lawn edger of claim 1, in which said support comprises a member, said control element being mounted on the exterior of said member, said second cutting element being mounted on the interior of said member, said member having a vertically elongated slot, said connecting means passing through said slot in said member.

12. The lawn edger of claim 11, in which said first cutting element is operatively connected to a shaft and said second cutting element is provided with a vertically elongated slot, said shaft passing through said slot in said second cutting element.

13. The lawn edger of claim 11, in which said first cutting element is operatively connected to a shaft, and said second cutting element is provided with a vertically elongated slot, said shaft passing through said slot in said second cutting element, and resilient means urging said first cutting element against said second cutting element.

14. The lawn edger of claim 11, in which said operative connection comprises a cam operatively connected to said control element for movement therewith and a cam follower operatively connected to said second cutting element and engaging said cam.

15. The lawn edger of claim 14, in which said first cutting element is operatively connected to a shaft and said second cutting element is provided with a vertically elongated slot, said shaft passing through said slot in said second cutting element, and resilient means urging said first cutting element against said second cutting element.

16. A lawn edger comprising a support including a member, a first cutting element rotatably mounted on said support, a second cutting element mounted on said member so as to be vertically movable relative to said member and cooperating with said first cutting element, a control element mounted on said member on the outwardly facing side thereof so as to be rotatable about an axis, said control element having a cam surface which varies in its distance from said axis, said member having a vertically elongated slot, and a cam follower operatively connected to said second cutting element, passing through said slot in said member, and operatively engaging said cam surface.

17. The lawn edger of claim 16, in which said control element has detent areas, said cam follower having a portion detent-engageable with said areas as said control element is rotated.

18. In the lawn edger of claim 16, a shaft on said support along which said first cutting element is axially movable, resilient means active on said first cutting element to urge it along said shaft and into cooperating engagement with said second cutting element, said second cutting element having a vertically elongated opening through which said shaft extends.

19. The lawn edger of claim 18, in which said control element has detent areas, said cam follower having a portion detent-engageable with said areas as said control element is rotated.

20. A lawn edger comprising a support, a first cutting element rotatably mounted on said support, a second cutting element cooperating with said first cutting element, said second cutting element being mounted on said support so as to be vertically movable relative thereto, a control element mounted on the exterior of said support and movable between a plurality of operative positions, and means operatively connecting said control element and said second cutting element for positioning the latter vertically relative to said support in accordance with the operative position of said control element, said support comprising a member, said control element being mounted on the exterior of said member, said second cutting element being mounted on the interior of said member, said connecting means passing through said member, said operative connection comprising a cam mounted on said member and operatively connected to said control element for movement therewith, said member having a vertically elongated slot, and a cam follower operatively connected to said second cutting element, passing through said slot, and engaging said cam.

21. The lawn edger of claim 20, in which said first cutting element is operatively connected to a shaft and said second cutting element is provided with a vertically elongated slot, said shaft passing through said slot in said second cutting element.

22. The lawn edger of claim 20, in which said first cutting element is operatively connected to a shaft and said second cutting element is provided with a vertically elongated slot, said shaft passing through said slot in said second cutting element, and resilient means urging said first cutting element against said second cutting element.

23. The lawn edger of claim 20, in which said cam is mounted on the exterior of said support.

24. The lawn edger of claim 23, in which said first cutting element is operatively connected to a shaft and said second cutting element is provided with a vertically elongated slot, said shaft passing through said slot in said second cutting element.

25. The lawn edger of claim 23, in which said first cutting element is operatively connected to a shaft and said second cutting element is provided with a vertically elongated slot, said shaft passing through said slot in said second cutting element, and resilient means urging said first cutting element against said second cutting element.

References Cited

UNITED STATES PATENTS

| | | | |
|---|---|---|---|
| 2,496,377 | 2/1950 | Cochran | 56—256 |
| 2,844,934 | 7/1958 | Carlton | 56—256 |
| 3,047,999 | 8/1962 | Chadwick | 56—256 |

ROBERT E. BAGWILL, *Primary Examiner.*